D. L. CLINE.
ACCOUNT KEEPING SYSTEM.
APPLICATION FILED APR. 1, 1908.

916,270.

Patented Mar. 23, 1909.
2 SHEETS—SHEET 1.

WITNESSES:

INVENTOR
D. L. Cline
BY
W. T. FitzGerald & Co.
Attorneys

D. L. CLINE.
ACCOUNT KEEPING SYSTEM.
APPLICATION FILED APR. 1, 1908.

916,270.

Patented Mar. 23, 1909.
2 SHEETS—SHEET 2.

WITNESSES:

INVENTOR
D. L. Cline
BY W. J. FitzGerald & Co.
Attorneys

UNITED STATES PATENT OFFICE.

DANIEL L. CLINE, OF MEDFORD, OKLAHOMA.

ACCOUNT-KEEPING SYSTEM.

No. 916,270.　　　　Specification of Letters Patent.　　Patented March 23, 1909.

Application filed April 1, 1908. Serial No. 424,586.

*To all whom it may concern:*

Be it known that I, DANIEL L. CLINE, a citizen of the United States, residing at Medford, in the county of Grant and State of Oklahoma, have invented certain new and useful Improvements in Account-Keeping Systems; and I do hereby declare the following to be a full, clear, and exact description of the invention, such as will enable others skilled in the art to which it appertains to make and use the same.

This invention relates to new and useful improvements in "credit" system and it has primarily for its object to provide a system of this character wherein a simple and efficient method is produced for the keeping of accounts.

It is a further object of the invention to provide a system of this character wherein checks are issued negotiable at certain localities, said checks being employed in lieu of legal tender, said checks being issued after the due signing of a promissory note or credit receipt.
It is also an object of the invention to provide in combination with a system of this character, a novel filing or binding arrangement whereby the records of transactions pertaining to one individual may be conveniently filed away and keeping the records of the various transactions in such a way as to effect and expedite a settlement.

It is furthermore an object of the invention to provide a novel system of this character which will be simple in operation, efficient and advantageous in practice.

With the above and other objects in view the invention consists of the details of construction and novel arrangements and combination of parts to be hereinafter set forth.

Figure 6:
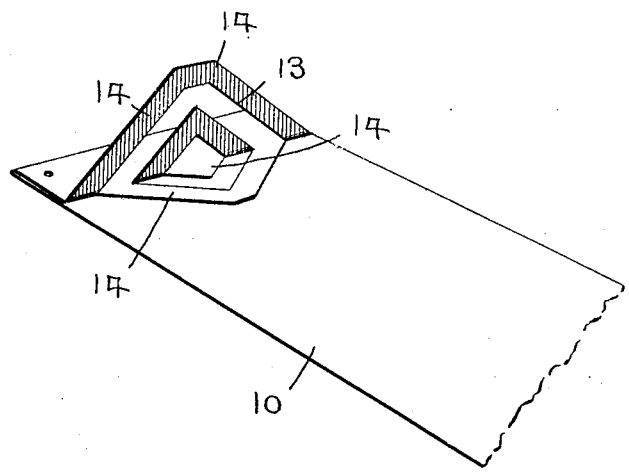
Figure 7:
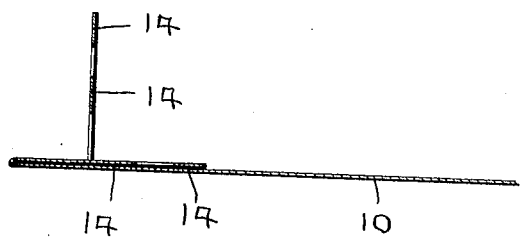

In describing the invention in detail reference will be had to the accompanying drawings forming part of this specification, wherein like characters of reference denote corresponding parts in the several views, in which, Figure 1 is a plan view of a record employed in the invention. Fig. 2 is a view in plan with a cover of the record opened illustrating the form of promissory note or check receipt to be employed together with an additional means for retaining the various records from displacement. Fig. 3 is a view in plan of the inner face of the rear cover showing the arrangement for recording the "debits". Fig. 4 is a similar view showing a slightly modified arrangement. Fig. 5 is a view similar to Fig. 4 showing the inner face of the rear cover provided with an additional means for holding the various records against displacement. Fig. 6 is a fragmentary view in perspective of a cover showing the flaps thereof in different positions, and, Fig. 7 is a longitudinal sectional view of Fig. 6.

When a person desires to purchase a certain amount of goods from a firm on credit he goes to a firm issuing such credit and signs a promissory note or check receipt as at 1 Fig. 2 for the desired amount. After the note has been properly executed the individual is given a series of checks aggregating the sum signed for. These checks may be of any desired metal or may be of paper and being of the form of a bank check excepting that after the word "dollars," as in the usual check the phrase "worth of merchandise" is added. This check also has indicated thereon the name of the firm with which the individual desires to do business. In the practical operation of this system it has been found of value to also give the individual a series of metallic checks having marked thereon monetary values of the same identities as the legal coins. These checks are further provided with advertising matter and the name of the party with whom the transaction is to be consummated as has been hereinbefore referred to with reference to the paper checks.

For convenience the leaf upon which the promissory note is carried is provided with a marginal portion 2, which has thereon a ruled space 3 for "credits." This leaf is provided with perforations and is interposed between suitable covers having perforations 4 to register with the perforations on the leaf hereinbefore referred to. Through these perforations a flexible member 5 is to be passed which will hold the leaf to the cover. On the back of one of the covers is written the name 6 of the individual so that when the record is filed away it can be properly indexed. The inner surface of, preferably, the rear cover is marked as at 7 in order that an accurate account of the "debits" including interest may be recorded. In Fig. 3 a partial account is shown, while in Figs. 4 and 5 a closed account is shown which will it is thought disclose the idea.

Figs. 3 and 4 differ in that the "Amt." is positioned above both the "Dols." and "Cents" indications, while in Fig. 4 the "Dols." and "Cents" indications are omitted but inferred by a separating line 8 under the "Amt." column. In both forms, however, a line 9 extends transversely of the cover provided for the signature of the individual as is shown more particularly in Fig. 5.

Should the individual at the time when his note falls due fail to make the proper payment or extend the note a record of the proceedings in collecting the claim may be kept on the inner surface 10 of the front cover. What papers or records that may accrue during the life or activity of the accounts are also filed between the covers and held thereto by the flexible member 5, said additional record being indicated by the leaves 11 in Fig. 2. Should it be desired to add additional records without removing the flexible member 5 a flexible member 12 is gummed to the under surface of the top cover adjacent the outer end of said member and is provided with a plurality of converging slits 13 which form flaps 14. These flaps have their under surfaces gummed, which when moistened are caused to engage the records. It is thought obvious that the records will be securely held within the cover. This member 12 also has the additional benefit of securing within the cover any record which may become detached from the flexible member 5. As the size of the record may grow a second flexible member 15 can be secured to the outer end of the rear cover said section being approximately of the same structure as the flap 12 and employed for the same purpose.

What I claim is:

1. In combination, covers, means for securing leaves between the covers and an additional securing means comprising a flexible member secured to a cover, said flexible member being provided with a plurality of approximately V-shaped slots to form a plurality of tongues, said tongues being gummed.

2. In combination, covers, means for securing leaves between the covers and an additional securing means comprising a flexible member secured to a cover, said flexible member being slotted to form a plurality of tongues, said tongues being gummed.

In testimony whereof I have signed my name to this specification in the presence of two subscribing witnesses.

DANIEL L. CLINE.

Witnesses:
F. O. DORT,
W. J. GARDINER.